(No Model.) 2 Sheets—Sheet 1.
T. A. EDISON.
ELECTRICAL DEPOSITING METER.
No. 484,183. Patented Oct. 11, 1892.
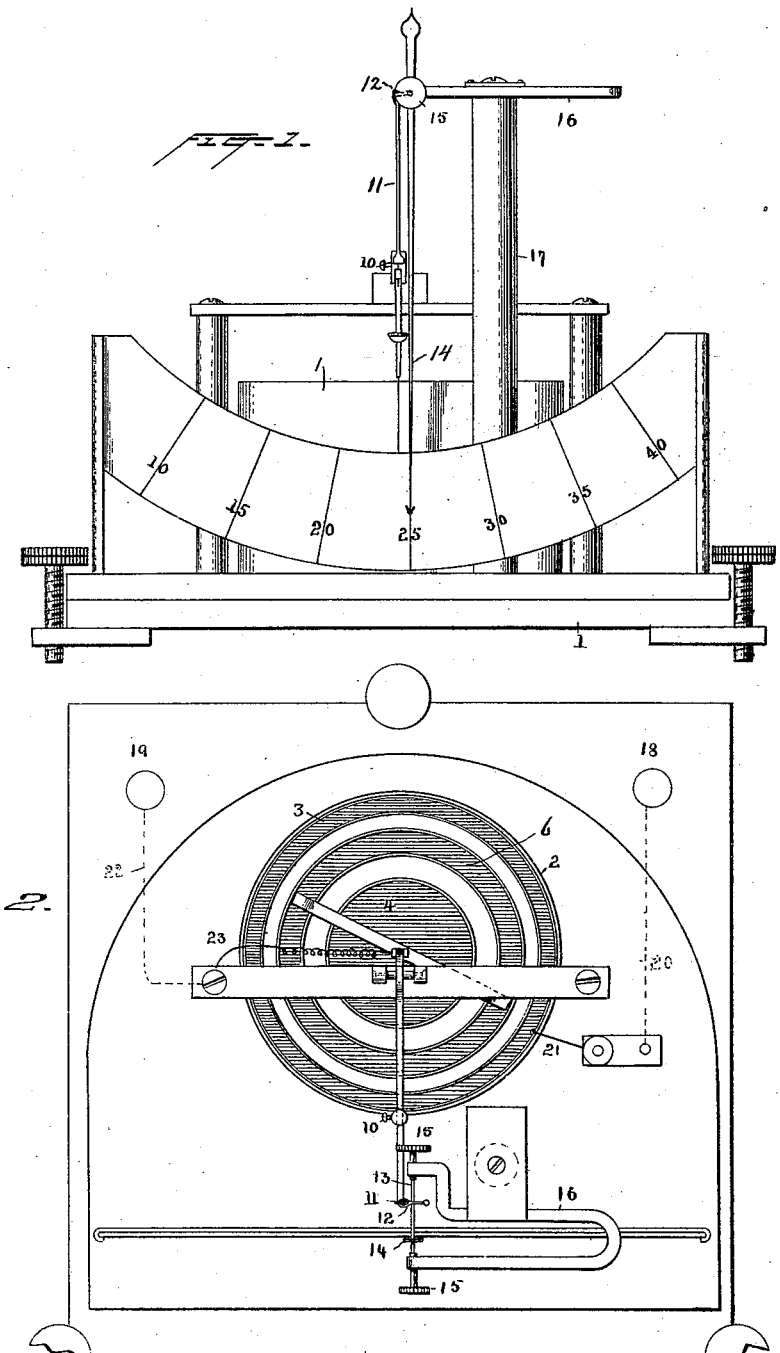

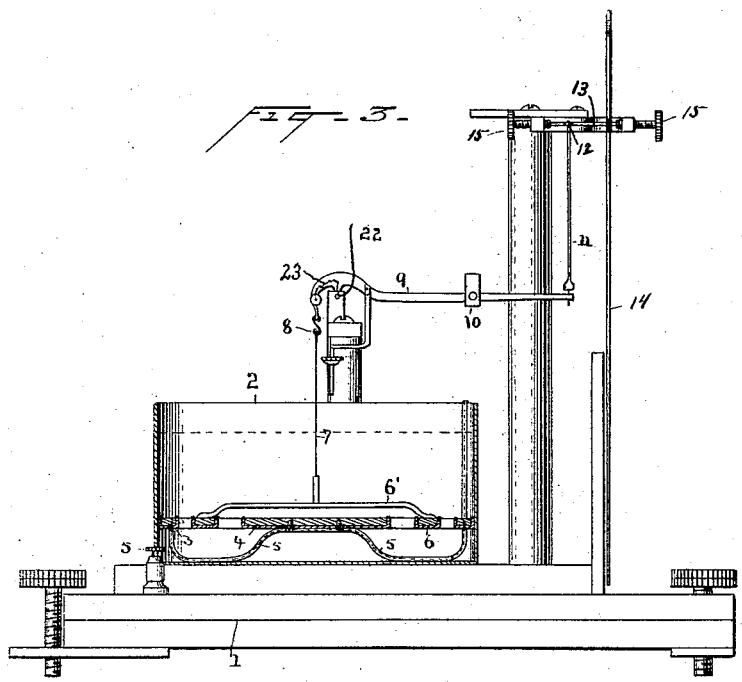

UNITED STATES PATENT OFFICE.

THOMAS A. EDISON, OF LLEWELLYN PARK, NEW JERSEY.

ELECTRICAL DEPOSITING-METER.

SPECIFICATION forming part of Letters Patent No. 484,183, dated October 11, 1892.

Application filed September 2, 1891. Serial No. 404,497. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Electrical Depositing-Meters, (Case No. 922,) of which the following is a specification.

The present invention relates to that class of electrical meters in which current is measured by the weight of metal deposited from a suitable electrolyte through which the current is passed.

The object of the present invention is to produce a simple and reliable apparatus of this character.

In the accompanying drawings, Figure 1 is a face view of the meter, the inclosing case being removed. Fig. 2 is a plan view of the meter; and Fig. 3 is a view at right angles to Fig. 1, the depositing-cell being in section.

The base 1 supports the glass cell 2, which contains zinc sulphate or other suitable electrolyte. Within the cell are two electrodes. One electrode is formed in two sections—viz., an outer ring-shaped section 3 and a central circular section 4. Each section consists of a cup-shaped body of hard rubber or other suitable material, within which is a body of zinc, if zinc sulphate is the electrolyte, or of other metal if some other electrolyte is employed. The surface of the zinc should be well amalgamated, in order that the best effects may be obtained. The other electrode is made in the same manner as just described, except that it consists of a single section in the form of a ring 6, and this ring occupies the annular space between the two sections of the other electrode. The first electrode is stationary, the two sections being supported by the standards 5, which are formed by an insulated conductor serving to connect the two sections 3 4. The second electrode is suspended by means of a cross-bar 6′ and a fine metal wire 7, which extends up to the hook 8, suspended from the short arm of the weighing-lever 9. 10 is a counter-balance for this electrode. The long arm of the weighing-lever is connected by means of a link 11 to an arm 12, projecting a short distance to one side of the spindle 13, which carries the pointer 14, the lower end of which is adapted to travel over the graduated scale. The spindle 13 is held between screws 15 in the bracket 16, mounted on the top of the post 17, rising from the base of the meter. The arm 12 may have a small counterbalance-weight on the opposite side of the spindle from the connection with link 11. 18 is one terminal of the meter and 19 is the other terminal. The former is connected by wire 20 and conductor 21 to the two sections of the first-described electrode. The other terminal is connected by wire 22 and light flexible wire 23 to the wire 7, and from said wire to the second electrode.

When it is desired to use the meter, the weight 10 is adjusted until it just counterbalances the electrode 6. The pointer will then stand at the center of the scale. Current is then passed into the meter at one electrode and out through the other. If the current is in the proper direction to make 6 the cathode, then zinc will be deposited on this electrode from both sides—that is, from the section 3 on one side and the section 4 on the other side. This causes the deposited zinc to be evenly distributed over the body of the cathode and not to be piled up on one edge, and since the rubber cup-shaped rings or holders are slightly extended above the surface of the electrode carried by them, there is no danger of particles of deposited metal falling or being jarred off from the cathode, thus adding to the accuracy of the meter. As metal is deposited on the cathode the scale-beam gradually is tilted and the pointer moved a corresponding extent, and at any time the exact amount of current used can be calculated from the weight indicated by the pointer. Instead of marking numbers indicating weights on the scale, electrical units corresponding to the weights may be placed directly on the scale, thereby avoiding the necessity of calculation in reading the meter. When metal has been deposited on the cathode so as to carry the index-pointer to the limit of its movement the current may be reversed through the meter, metal being carried from the central electrode to the two sections 3 4 and the pointer will travel back over its course and to the other end of the scale. In this case it will evidently be necessary to read the scale in an opposite direction from the first reading.

It will be seen that the main feature of the invention is the placing of one electrode between two parts or sections of the other electrode, so that metal is deposited from two sides. To accomplish this it is evidently not essential that the electrode should be of just the form shown and described.

What I claim is—

1. The combination, in a depositing-meter, of a cell, an electrolyte and two electrodes therein, one electrode being of such form and arrangement that parts of it stand on opposite sides of the other electrode, and means for weighing one electrode, whereby the current may be measured by the weight of metal deposited or removed from said electrode, substantially as described.

2. The combination, in a depositing-meter, of a single cell, an electrolyte therein, two electrodes in the electrolyte, one being of such form and arrangement that parts of it stand on two opposite sides of the other electrode, and means for weighing one electrode, substantially as described.

3. The combination, in a depositing-meter, of a cell, an electrolyte therein, two electrodes in the electrolyte, one electrode being in parts separated by a space, and the other electrode being between said parts, and means for weighing one of the electrodes, substantially as described.

4. The combination, in a depositing-meter, of a single cell, an electrolyte therein, and two electrodes in the electrolyte, one electrode being in two parts separated by an annular space and the other electrode being of ring shape and between said parts, substantially as described.

5. The combination, in an electrical meter, of the ring electrode, the weighing apparatus therefor, and the second electrode on two sides of the first electrode, substantially as described.

6. The combination of an electrode for a depositing-meter, consisting of a cup-shaped insulating body, a metal forming the circuit terminal within said body and exposed on its upper side, and a support holding said electrode in a horizontal position, substantially as described.

This specification signed and witnessed this 31st day of July, 1891.

THOS. A. EDISON.

Witnesses:
JOHN F. RANDOLPH,
FREDERICK OTT.